(12) United States Patent
Barbe et al.

(10) Patent No.: US 12,526,897 B2
(45) Date of Patent: Jan. 13, 2026

(54) AUTONOMOUS CIRCADIAN LIGHTING SYSTEM WITH ENVIRONMENTAL AND SENSOR INPUT

(71) Applicants: Brian Barbe, Haymarket, VA (US); Alexander Wu, Haymarket, VA (US); Seongyong Lim, Haymarket, VA (US); Wesley Cheng, Haymarket, VA (US)

(72) Inventors: Brian Barbe, Haymarket, VA (US); Alexander Wu, Haymarket, VA (US); Seongyong Lim, Haymarket, VA (US); Wesley Cheng, Haymarket, VA (US)

(73) Assignee: Stack Inc.

( * ) Notice: Subject to any disclaimer, the term of this patent is extended or adjusted under 35 U.S.C. 154(b) by 288 days.

(21) Appl. No.: 18/201,637

(22) Filed: May 24, 2023

(65) Prior Publication Data

US 2024/0397597 A1   Nov. 28, 2024

(51) Int. Cl.
H05B 47/115 (2020.01)
H05B 47/12 (2020.01)
H05B 47/16 (2020.01)

(52) U.S. Cl.
CPC .......... *H05B 47/115* (2020.01); *H05B 47/12* (2020.01); *H05B 47/16* (2020.01)

(58) Field of Classification Search
CPC ....... H05B 47/12; H05B 47/16; H05B 47/115
See application file for complete search history.

(56) References Cited

U.S. PATENT DOCUMENTS

| | | | |
|---|---|---|---|
| 11,528,795 B2* | 12/2022 | Herf | H05B 47/16 |
| 2021/0084733 A1* | 3/2021 | Hamm | H05B 45/22 |
| 2021/0113805 A1* | 4/2021 | Myer | H05B 45/12 |
| 2021/0275023 A1* | 9/2021 | Kalantarian | G16H 50/30 |
| 2021/0315083 A1* | 10/2021 | Harrison | H05B 45/22 |
| 2022/0279634 A1* | 9/2022 | Upton | H05B 47/16 |

* cited by examiner

*Primary Examiner* — Alexander H Taningco
*Assistant Examiner* — Pedro C Fernandez
(74) *Attorney, Agent, or Firm* — PatentPC; Bao Tran

(57) ABSTRACT

This invention proposes a solution by including numerous environmental factors and sensor input to provide additional context for an appropriate Lighting setting at any particular moment. The invention will continually evaluate and adjust lighting behavior based on numerous factors.

17 Claims, 18 Drawing Sheets

Autonomous Circadian Lighting System as a Whole

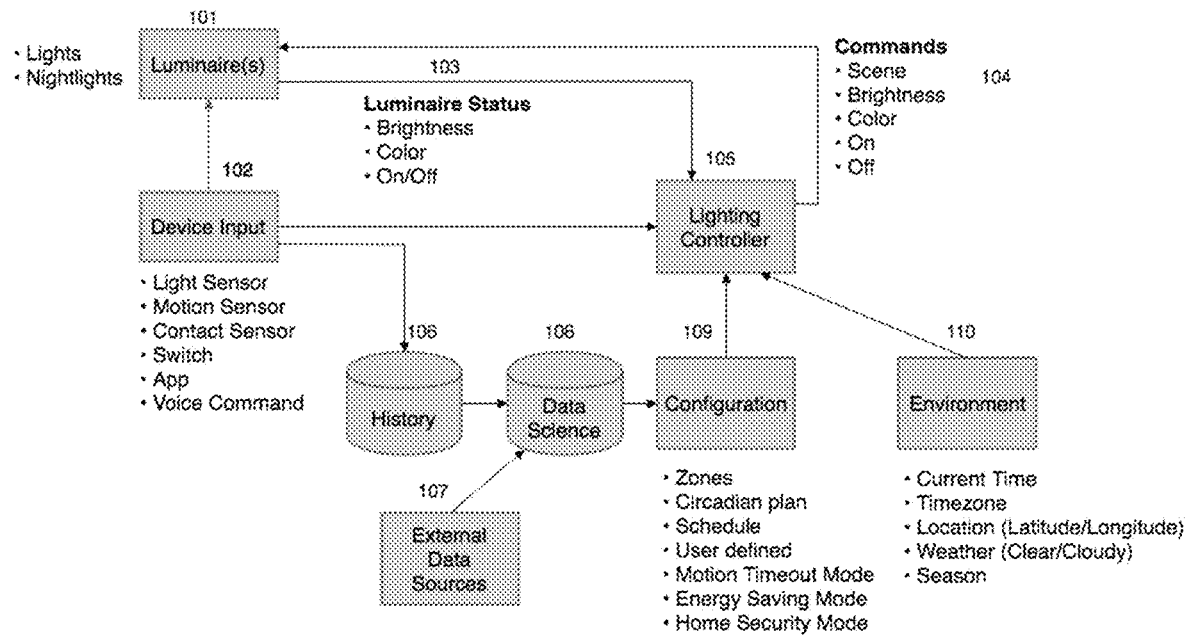
Figure 1: Autonomous Circadian Lighting System as a Whole
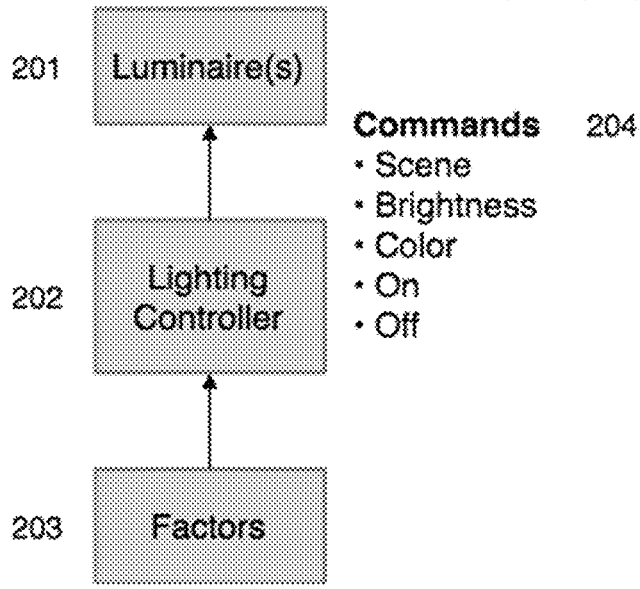
Figure 2: Lighting Controller

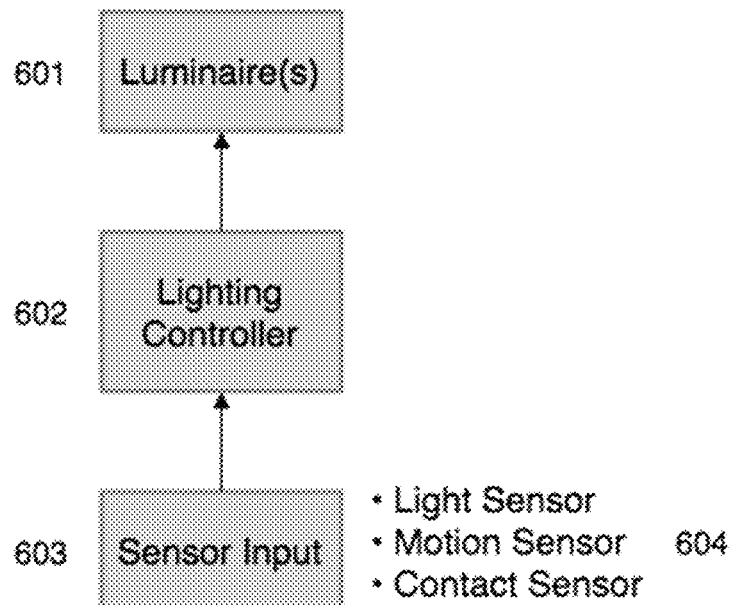
Figure 6: Sensor Input
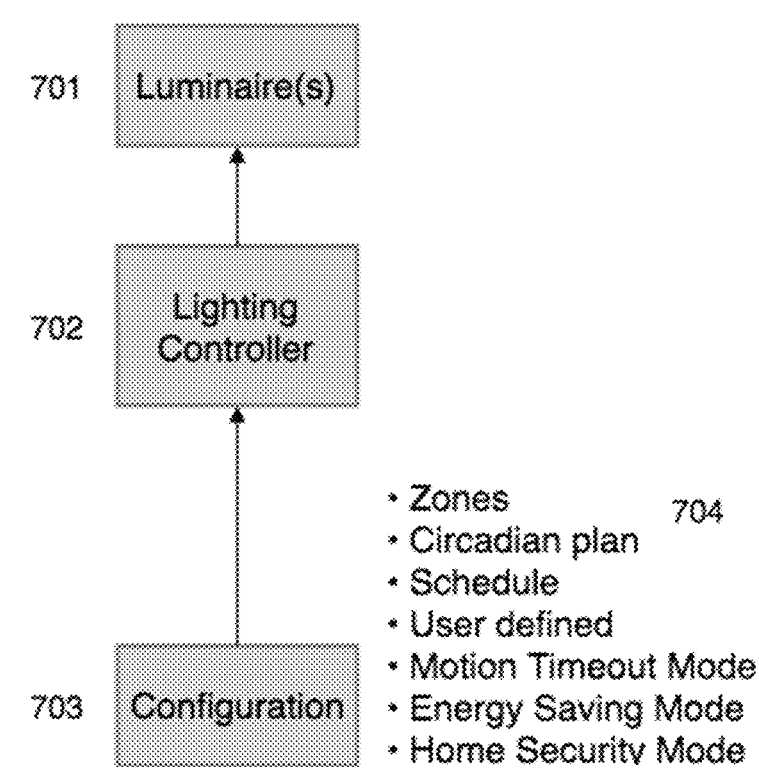
Figure 7: Configuration

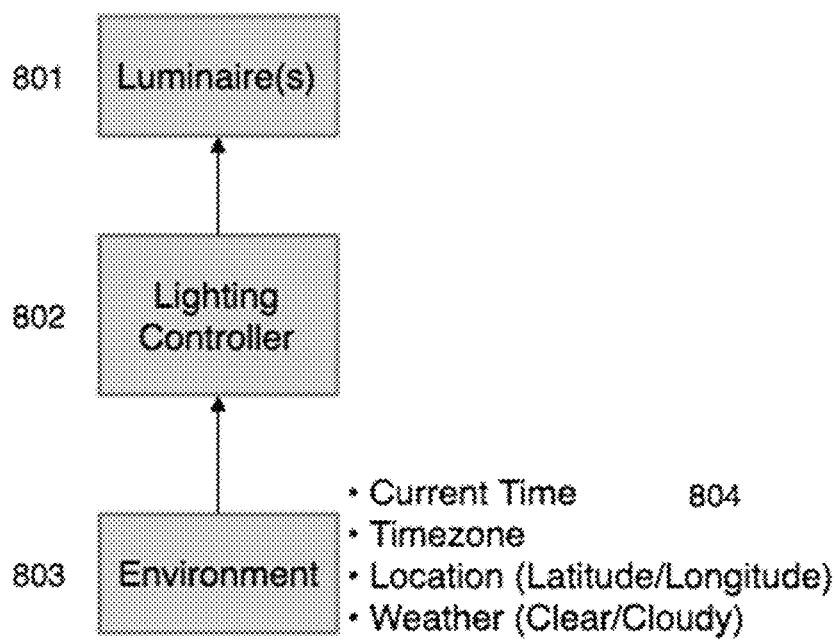
Figure 8: Environment
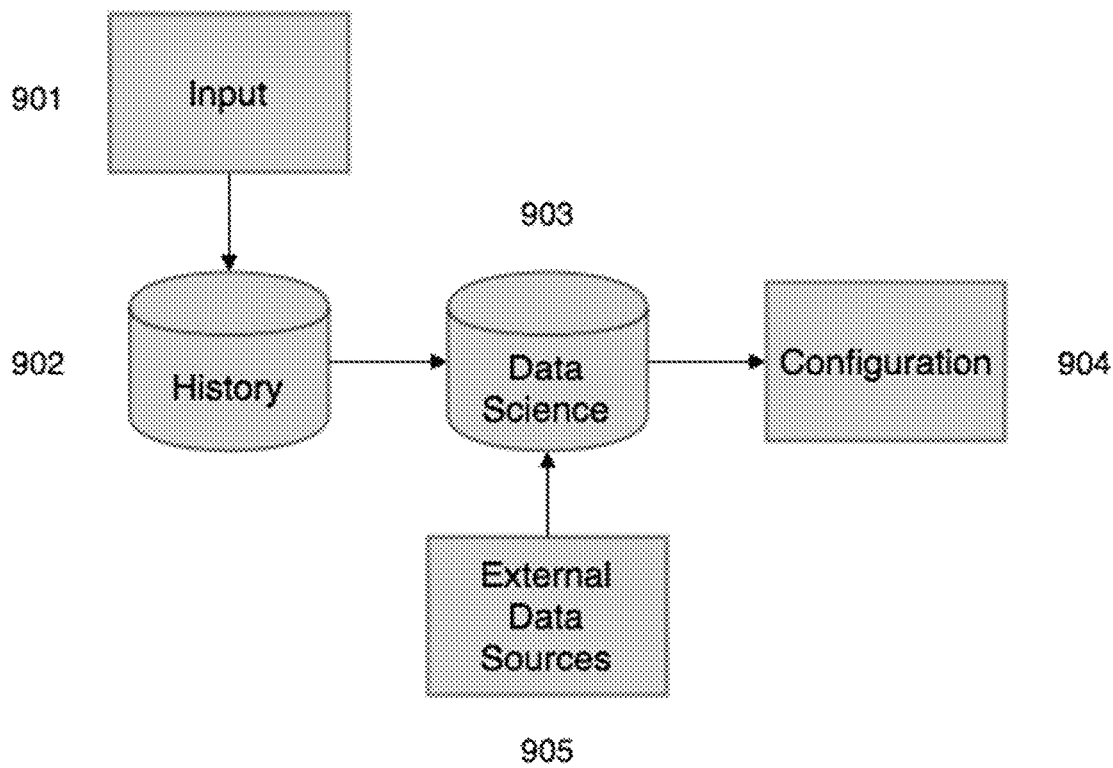
Figure 9: Historical and Data Science Input

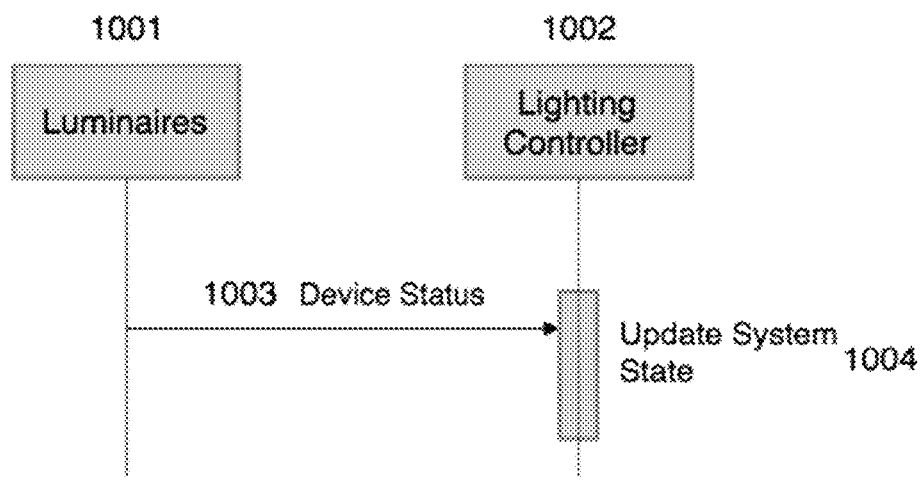
Figure 10: Luminaire Status Sequence Diagram
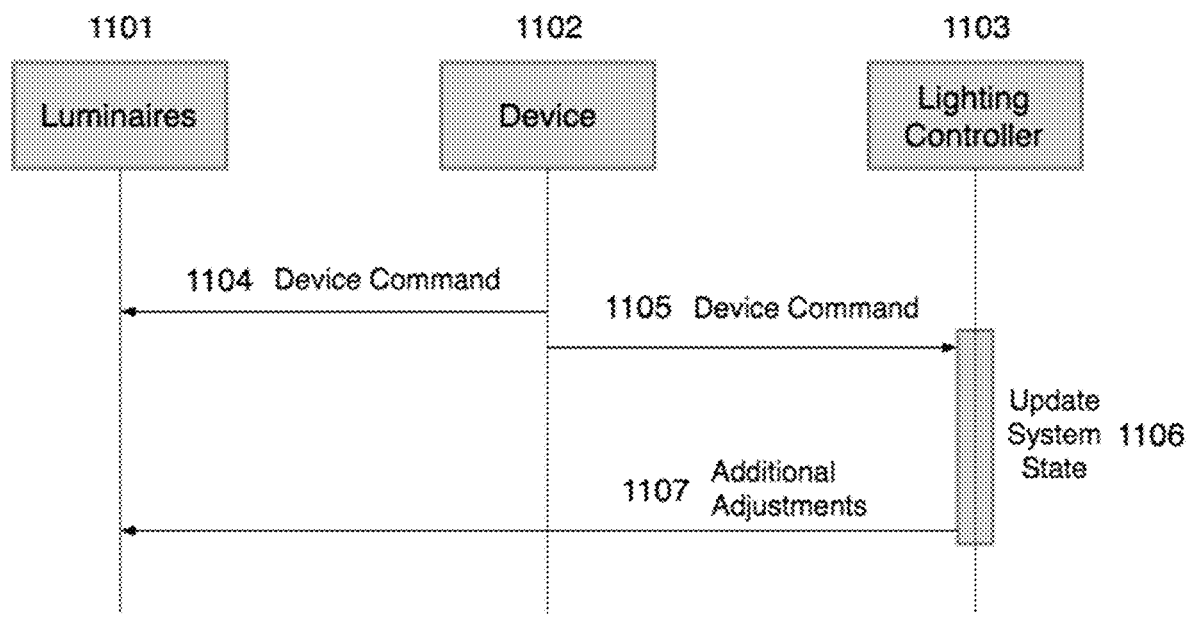
Figure 11: Direct Input from Device Sequence Diagram

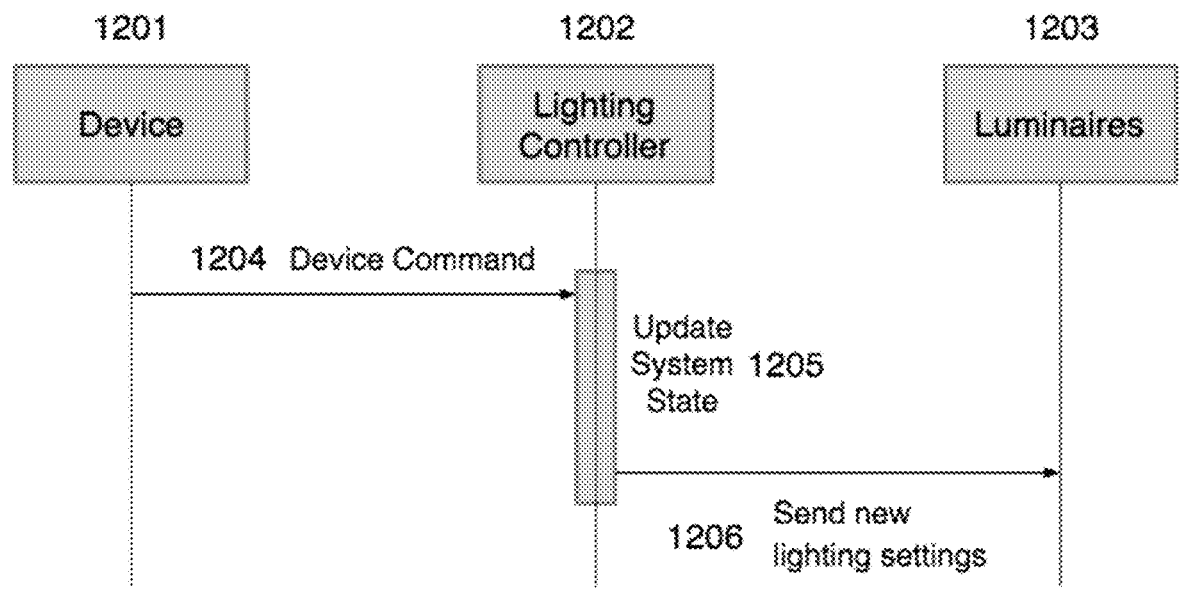
Figure 12: Indirect Device Input from Device Sequence Diagram
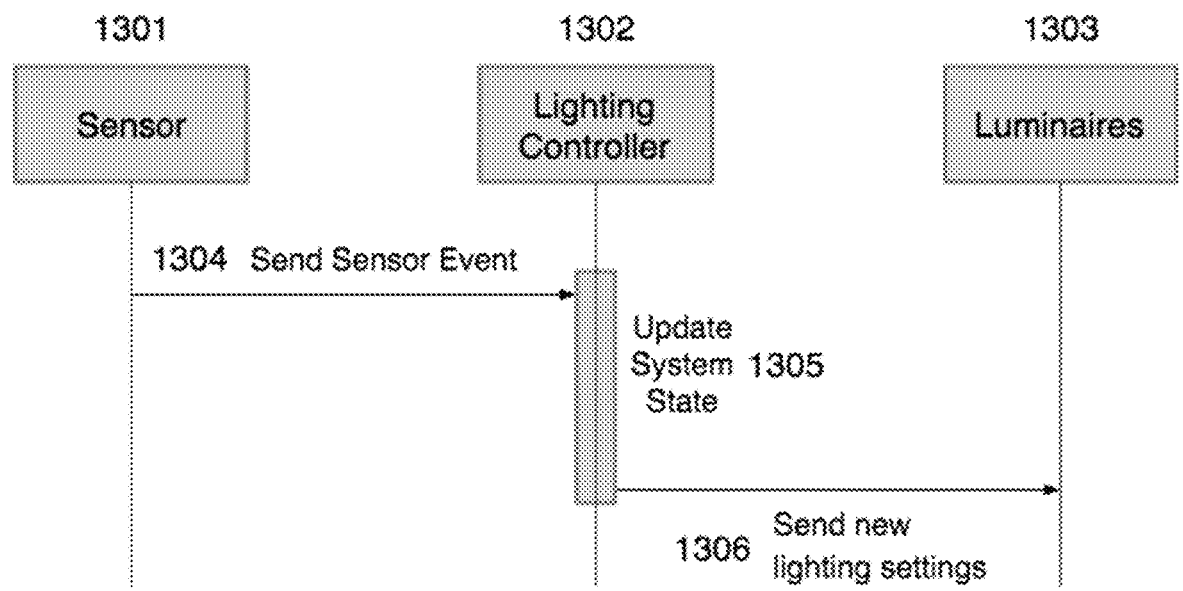
Figure 13: Sensor Input Sequence Diagram

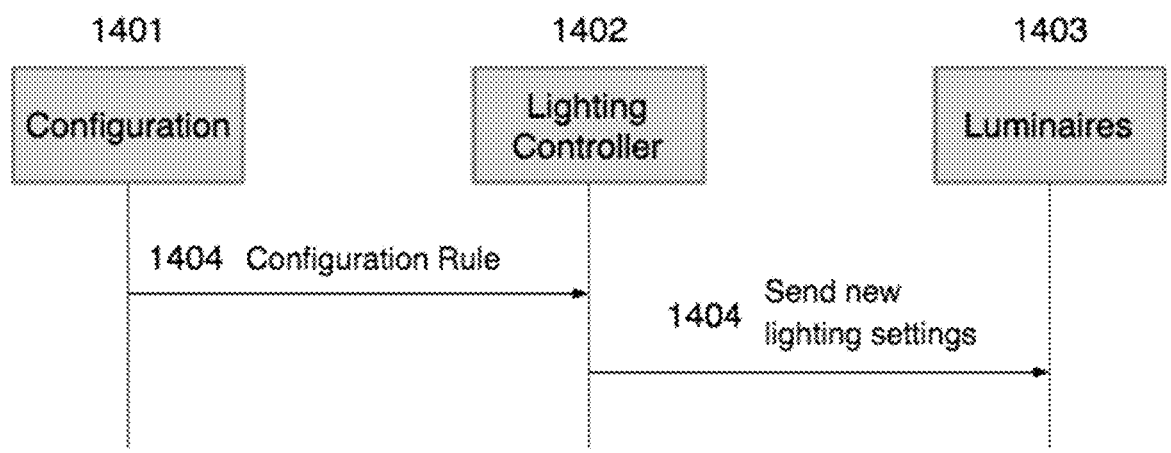
Figure 14: Configuration Rules Sequence Diagram
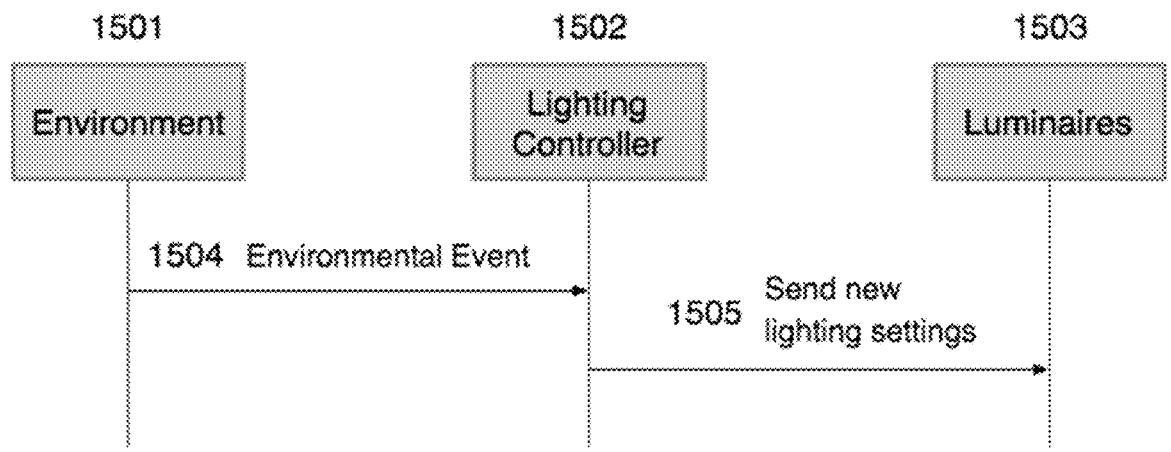
Figure 15: Environmental Input Sequence Diagram

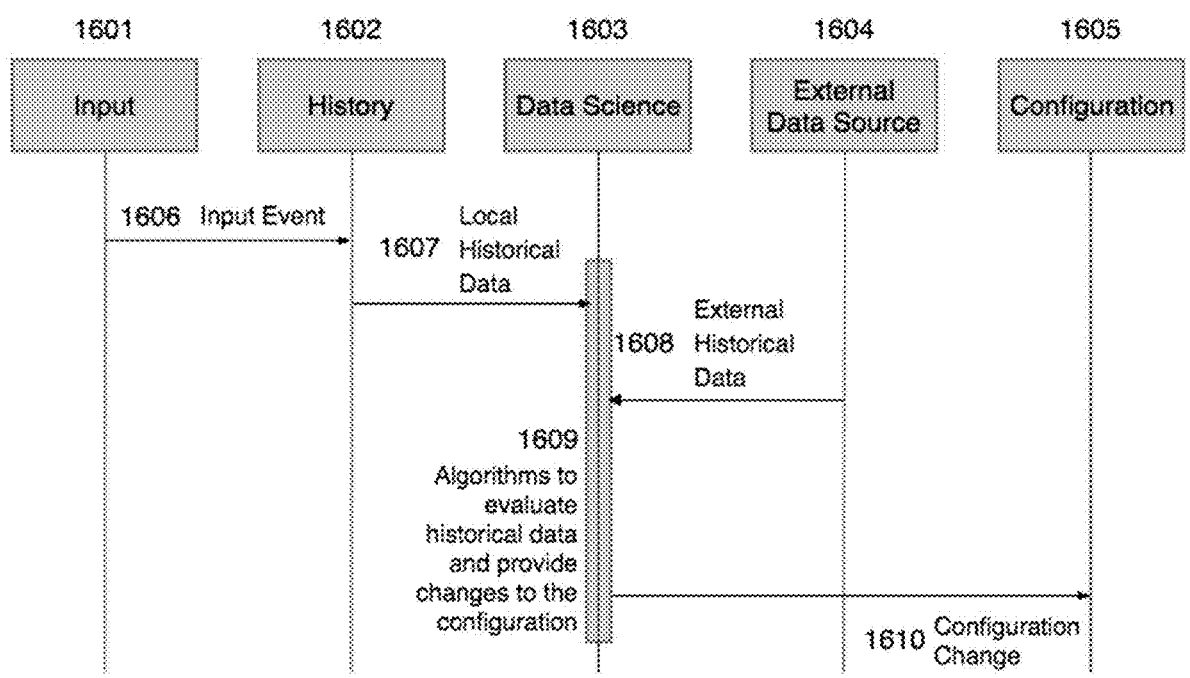
Figure 16: Data Science Sequence Diagram

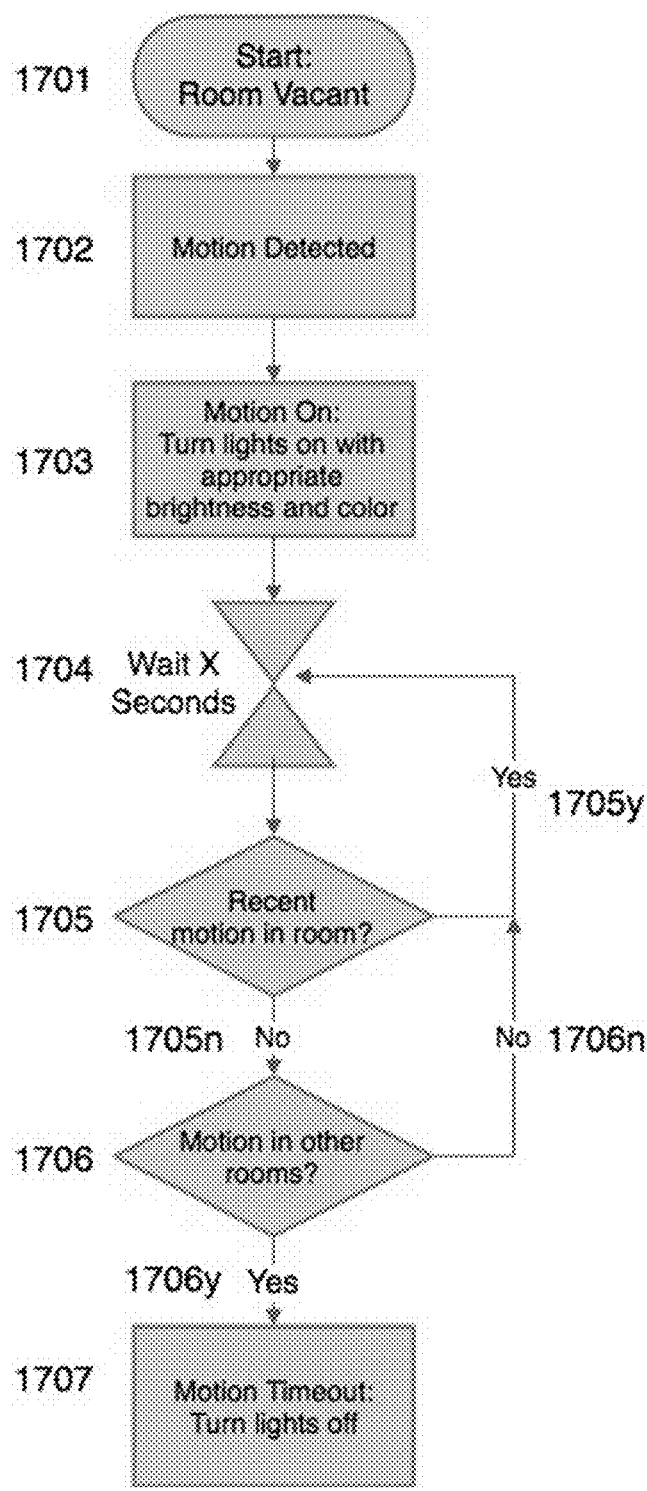
Figure 17: Motion On / Timeout Flow Diagram

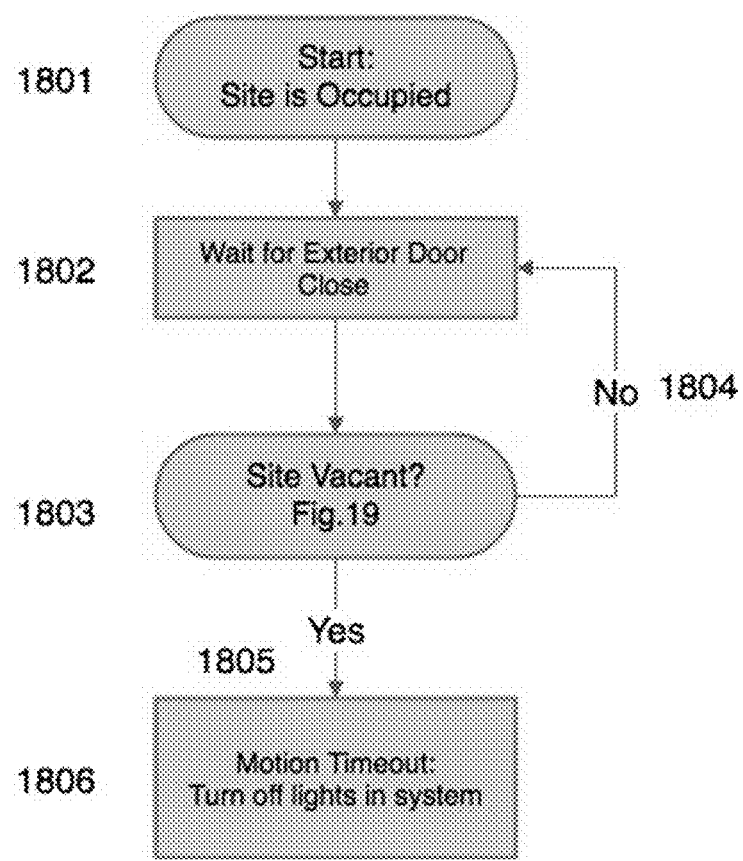
Figure 18: Site Exit Flow Diagram

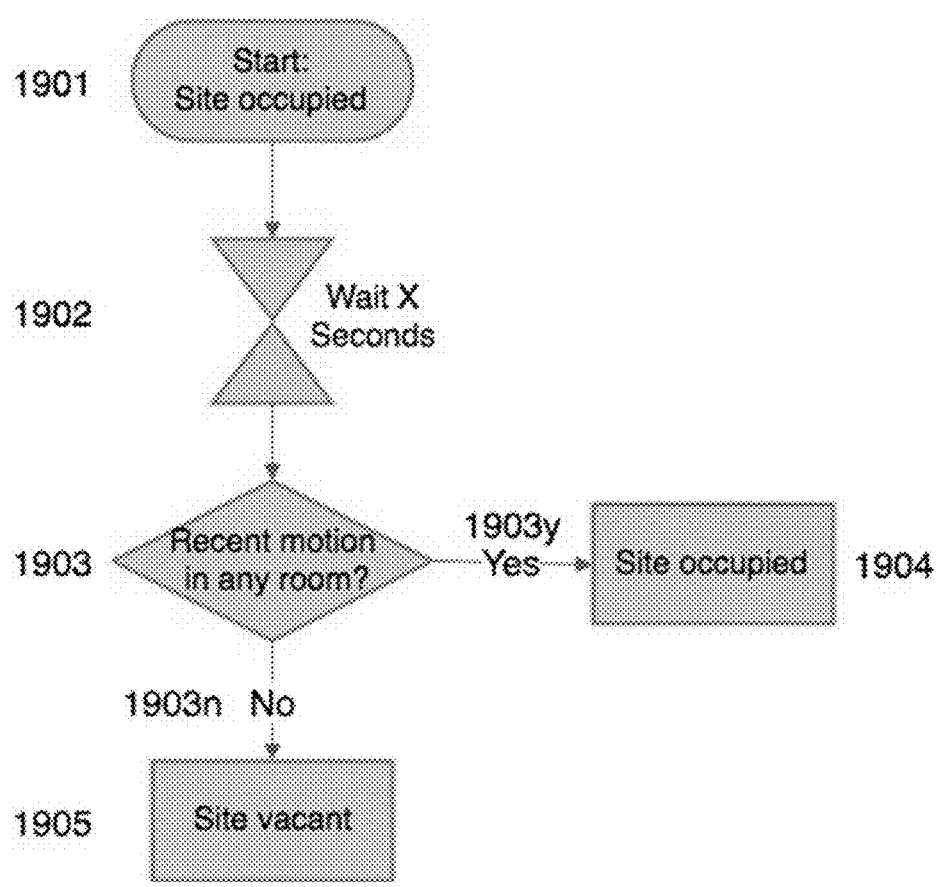
Figure 19: Site Occupancy Flow Diagram

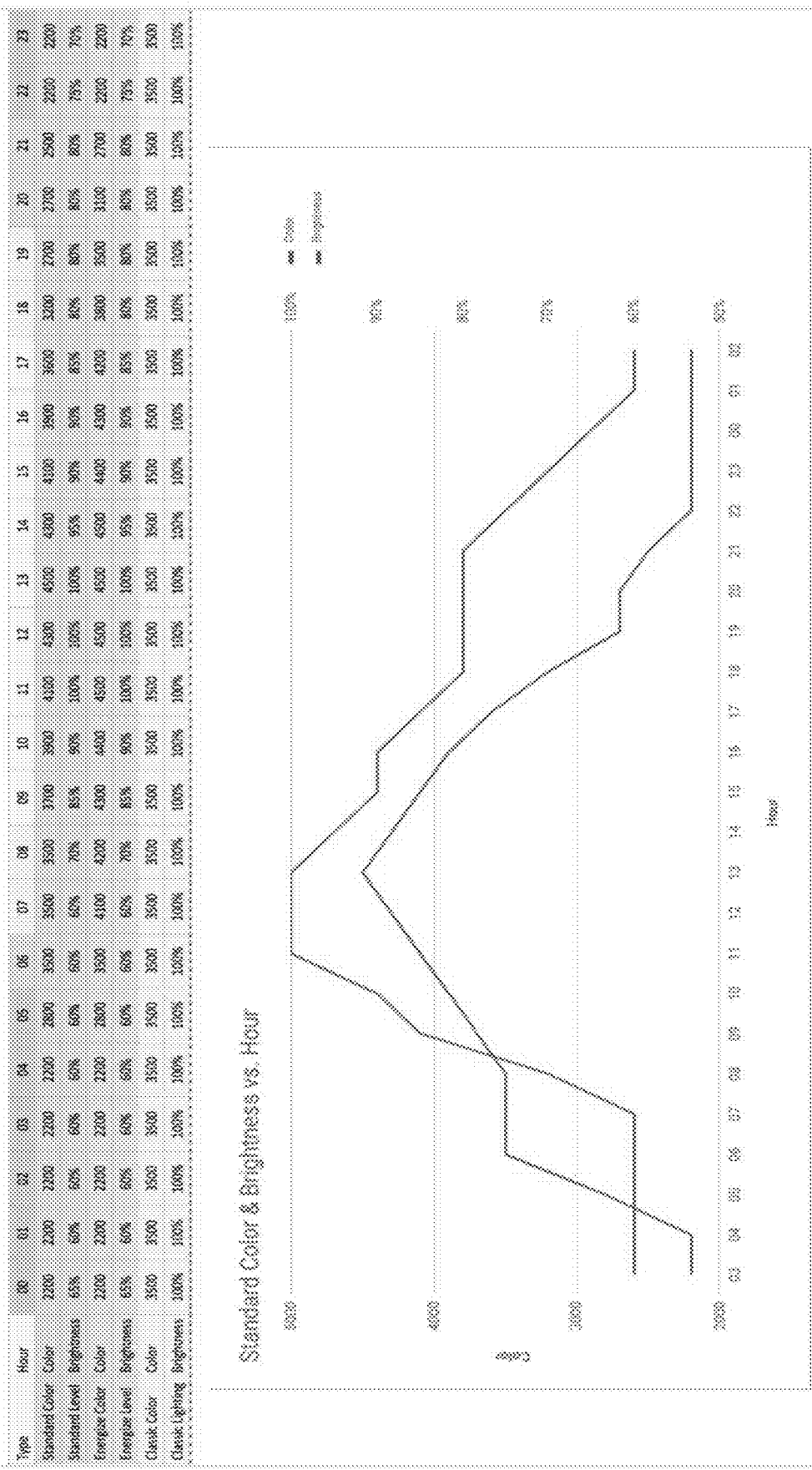

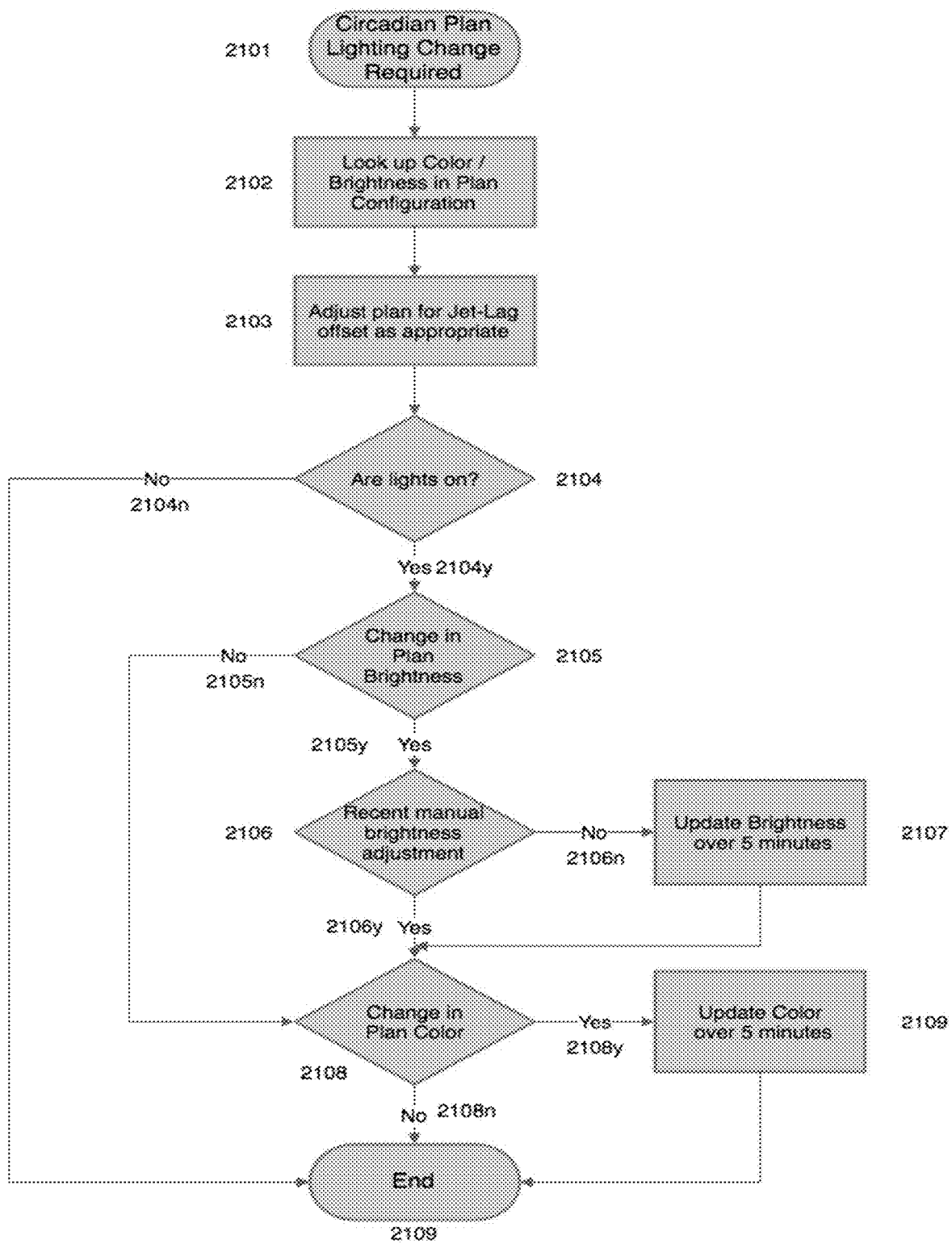
Figure 21: Circadian Plan Workflow Diagram

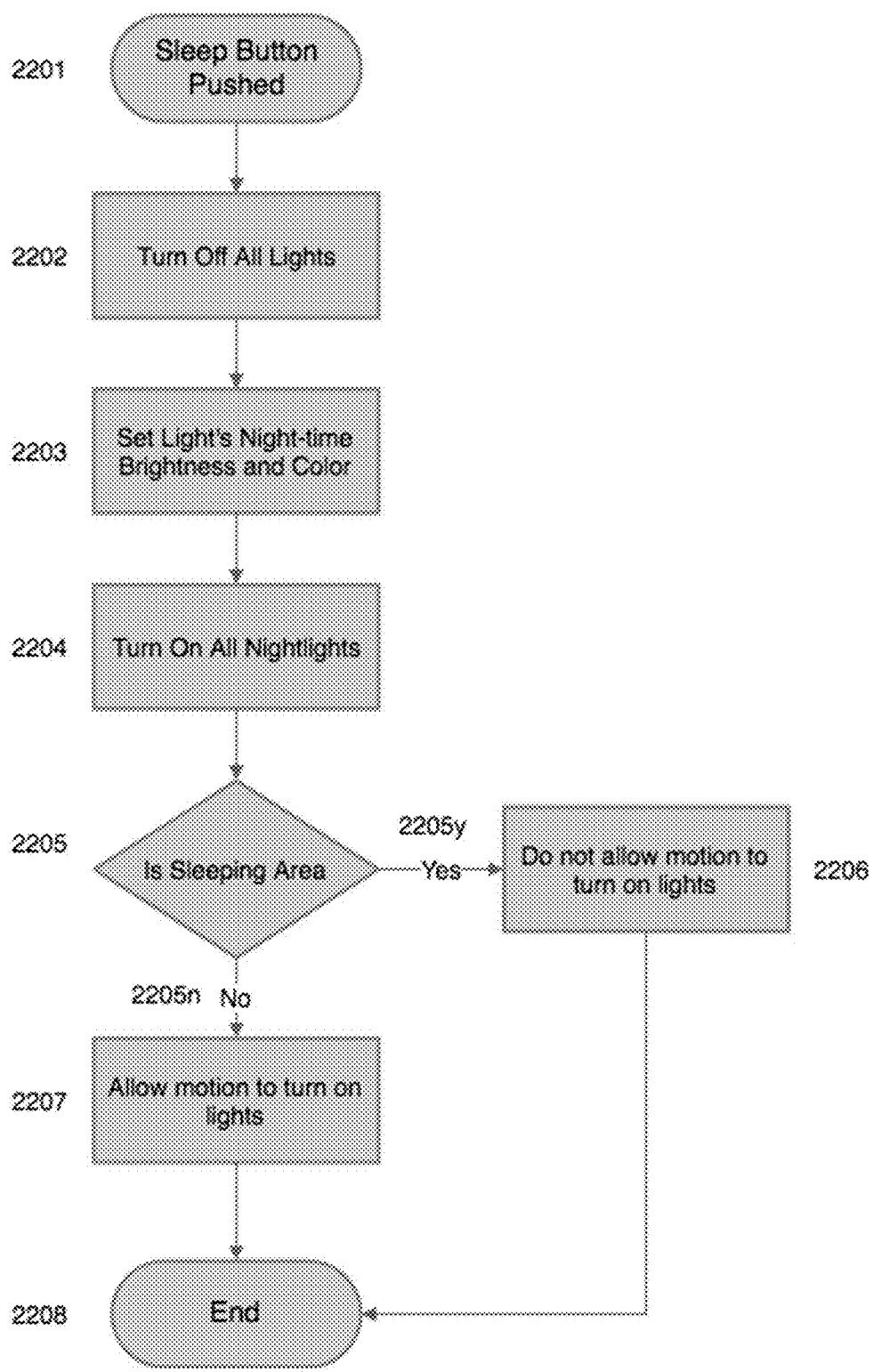
Figure 22: Sleep Mode Workflow Diagram

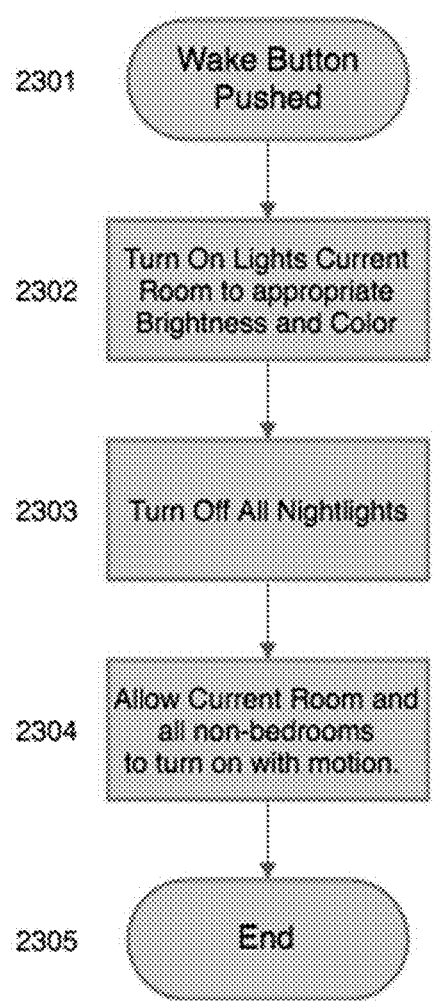
Figure 23: Wake Mode Workflow Diagram

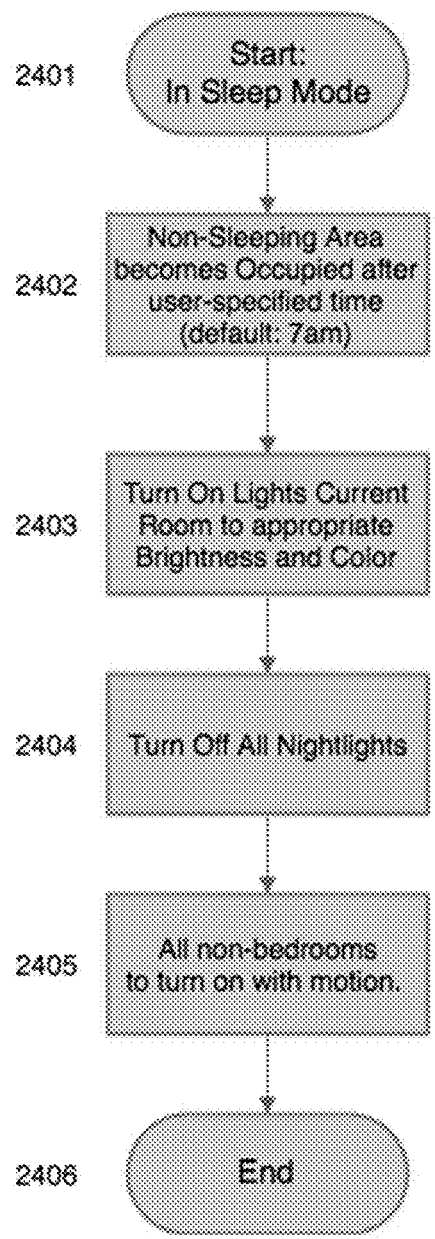
Figure 24: Auto-Wake Workflow Diagram

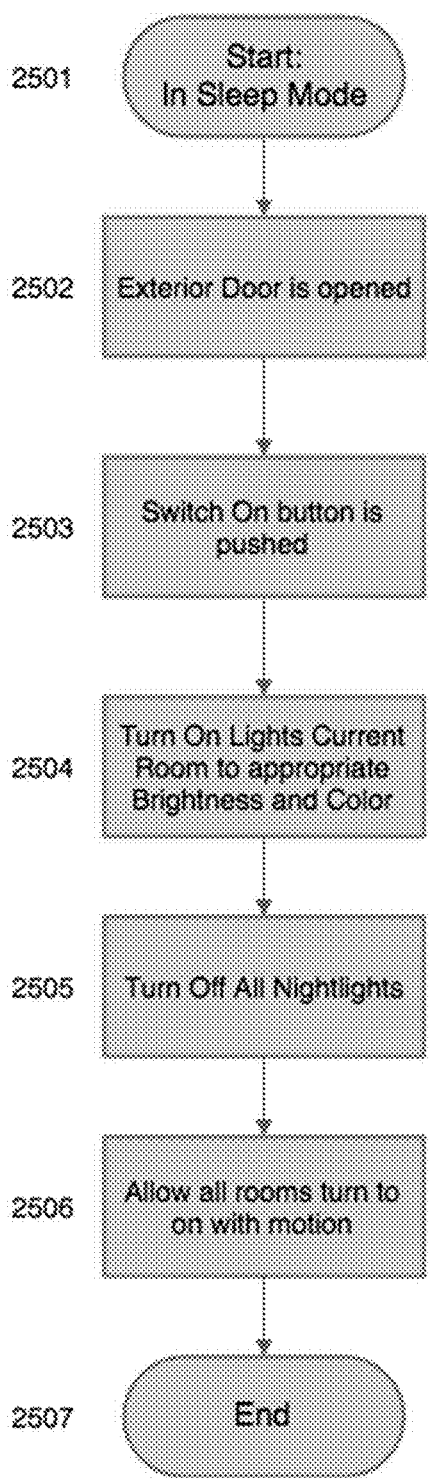
Figure 25: Response Auto-Wake Workflow Diagram

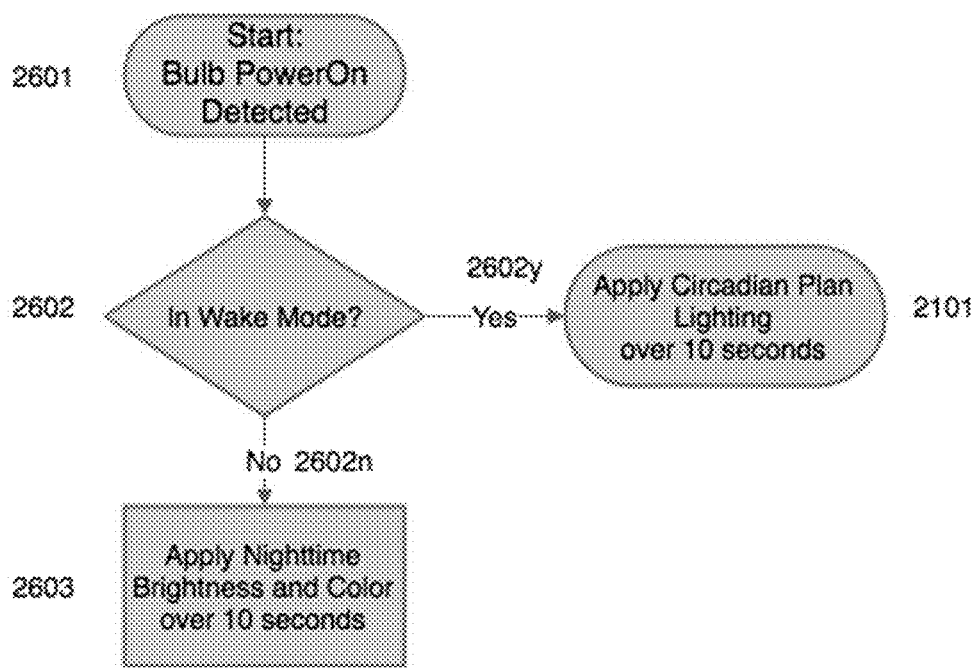
Figure 26: Bulb PowerOn Detected Workflow Diagram
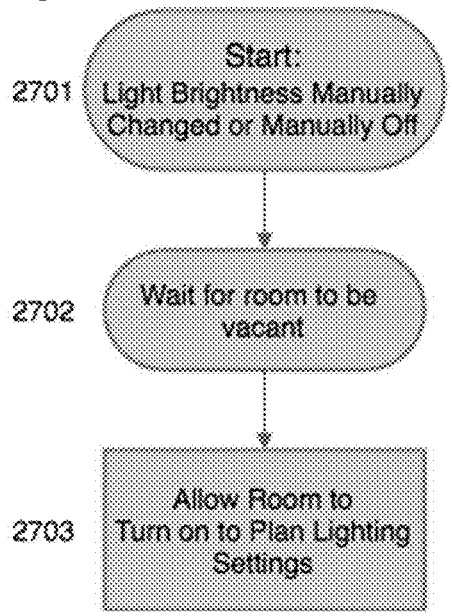
Figure 27: Return To Plan Workflow Diagram

AUTONOMOUS CIRCADIAN LIGHTING SYSTEM WITH ENVIRONMENTAL AND SENSOR INPUT

This application is related to application Ser. Nos. 18,201,648, 18,201,637, 18,201,630, 18,201,628, 18,201,624 and 18,201,618 the content of which is incorporated by reference.

FIELD OF THE INVENTION

The present invention relates to a circadian lighting system.

BACKGROUND

Circadian Lighting systems today typically provide changes in lighting color temperature and/or brightness throughout the day based on sunrise and sunset. Other information may provide additional context into what color temperature and brightness may be appropriate at that moment in time.

SUMMARY

In one aspect, an autonomous circadian lighting system includes:
- one or more light sources controlled by various inputs such as data from a light sensor, motion sensor, contact sensor, switch, app, or voice command;
- a lighting controller that controls the light sources based on configuration data;
- a history database that stores device input;
- a data science database that sets configuration data based on the device input and external data sources; and
- an environment input that includes time, time zone, location, weather, and season.

Implementations of the above aspects can include one or more of the following. The light sources are configured to adjust color temperature and intensity to mimic natural daylight throughout the day. A motion sensor input is used to detect occupancy and trigger lighting changes. A contact sensor input is used to detect open doors or windows and adjust lighting accordingly. The configuration data includes a home security mode that triggers lighting changes to simulate occupancy when the resident is away. Sensors can be used for detecting resident activity levels and adjusting lighting accordingly to promote an active lifestyle. Sensors can be used for detecting ambient temperature and humidity, and adjusting lighting accordingly to maintain a comfortable environment for the resident. Sensors can also detect noise levels, and adjust lighting accordingly to promote a rest environment for the resident. A sleep tracker monitors the resident's sleep patterns and adjusts the lighting accordingly to promote healthy sleep habits. A voice-activated control system that allows the resident to adjust the lighting settings as desired. A security system that uses the lighting to simulate occupancy when the resident is away from home, providing a sense of security and deterring potential intruders. Reminders for medication or other tasks can be sent based on the resident's circadian rhythm. The system can adapt the lighting plan based on the resident's activity levels and preferences, promoting engagement and independence. A mobile app allows caregivers or family members to remotely monitor the resident's lighting and activity patterns, providing peace of mind and enabling proactive interventions if needed.

BRIEF DESCRIPTION OF THE DRAWINGS

FIG. 1 is a block diagram illustrating the Overall system diagram showing the Lighting Controller (105) sending Commands (104) to Luminaires; Device Input (102) can send directly to Luminaires (101) or input into the Lighting Controller (105). Luminaire(s) (101) report their property statuses (103) to the Lighting Controller (105). Device Input (102) is recorded in History (106). Data Science (108) algorithms are against data from local History (106) as well as External Data Sources (107). Lighting Controller considers rules defined in Configuration (109) and the Environment (110) to choose appropriate lighting levels.

FIG. 2 is a block diagram illustrating Lighting Controller (105) is responsible for sending system-initiated commands (104) to the Luminaire(s).

FIG. 6 is a block diagram illustrating the Sensors (603) send events to the Lighting controller (602) which processes the event and adjusts the Luminaire(s) (601) appropriately.

FIG. 7 is a block diagram illustrating The Lighting Controller (702) considers configuration data and rules (703) and adjusts the Luminaire(s) (701) appropriately.

FIG. 8 is a block diagram illustrating The Lighting Controller (802) considers environmental data (803) and adjusts the Luminaire(s) (801) appropriately.

FIG. 9 is a block diagram illustrating the Input (901) is stored in History (902). Data Science (903) evaluates local Historical data (902) and external historical data (905) and which results in possible adjustments to the configuration (904).

FIG. 10 is a sequence diagram showing the flow of information, device status (1003), from the Luminaires (1001) to the Lighting Controller (1002) where the state of the system is updated (1004).

FIG. 11 is a sequence diagram showing commands from a device flow to (1104) the Luminaires (1101) as well as to (1105) the Lighting Controller (1003). The lighting controller updates its system state (1106) and sends any additional commands to the Luminaires (1101) as necessary.

FIG. 12 is a sequence diagram showing device commands (1204) from a device (1201) are sent directly to the Lighting Controller (1202). The Lighting Controller (1202) updates its system state (1205) and sends new lighting settings (1206) to the Luminaires (1203).

FIG. 13 is a sequence diagram showing a sensor (1301) sending a sensor event (1304) to the Lighting Controller (1302). The Lighting Controller processes the data and updates the system state (1305). New lighting settings (1306) are sent to the Luminaire(s) (1303) as needed.

FIG. 14 is a sequence diagram showing Configuration rules being read (1404) from the Configuration data (1401) by the Lighting Controller (1402). New settings are applied (1404) to the Luminaires (1403) as needed.

FIG. 15 is a sequence diagram showing an Environmental Event (1504) detected by the Lighting Controller (1502)

Figure 3:
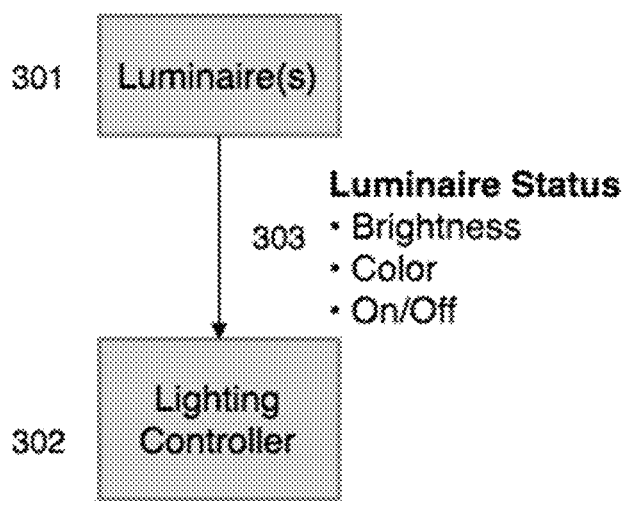
FIG. 3 is a block diagram illustrating the Luminaire(s) (301) report their status (303) to the Lighting Controller (302).
Figure 4:
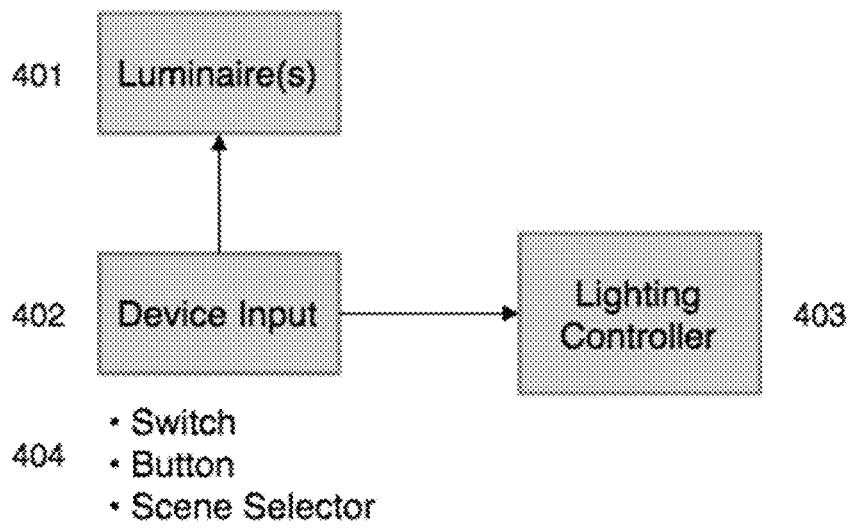
FIG. 4 is a block diagram illustrating the Devices (404) can send input directly (402) to Luminaire(s) (401) to adjust lighting properties as well as inform the Lighting Controller (403).
Figure 5:
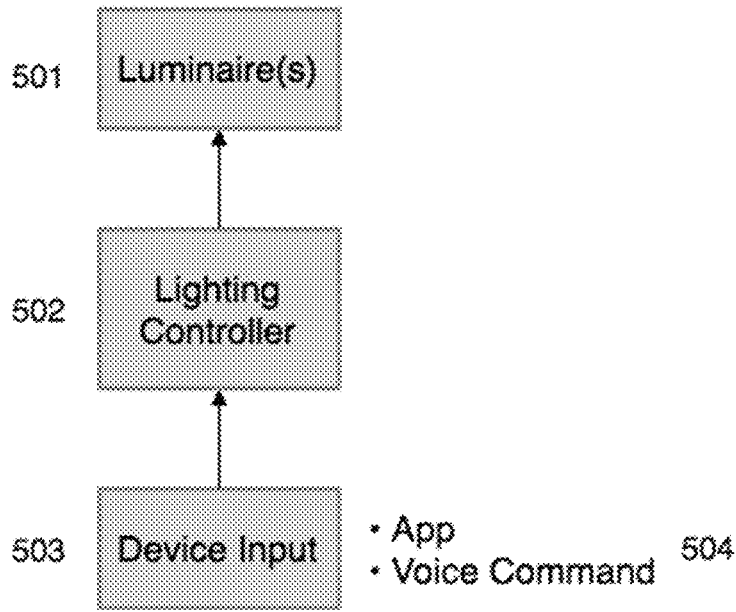
FIG. 5 is a block diagram illustrating the Devices (503) can send input indirectly through the Lighting Controller (502) which sends the appropriate lighting commands to the Luminaire(s) (501).

which results in new lighting settings being sent (1505) to the Luminaire(s) (1503) as needed.

FIG. 16 is a sequence diagram showing a source of input events (1606) being recorded in local history (1602). Data Science (1603) reads local history (1607) and external historical data (1608) from an External Data Source (1604), evaluates this data through algorithms (1609) and updates the configuration (1610) as needed.

FIG. 17 is a flow diagram illustrating how Motion On and Motion Timeout work.

FIG. 18 is a flow diagram illustrating how the Site Exit process works.

FIG. 19 is a flow diagram illustrating how a site is determined to be occupied after an event.

FIG. 20 is timeline graph showing illuminance (lux) and color temperature (K) during daylight hours.

FIG. 21 is a flow diagram illustrating how the circadian plan lighting properties are applied to lights in the system.

FIG. 22 is a flow diagram illustrating how sleep mode is applied to lights in the system.

FIG. 23 is a flow diagram illustrating how wake mode is applied to lights in the system.

FIG. 24 is a flow diagram illustrating how Auto-Wake is applied to lights in the system.

FIG. 25 is a flow diagram illustrating how Response Auto-Wake is applied to lights in the system.

FIG. 26 is a flow diagram Illustrating how the system handles a bulb power on.

FIG. 27 is a flow diagram illustrating how the system will return to the circadian plan.

DETAILED DESCRIPTION

Natural light characteristics, such as its brightness and color temperature, can vary throughout the day by a variety of factors such as time of day, the weather, the season, the location (latitude/longitude), etc. It is well established that natural light can induce signals within the body to be more alert or to feel sleepy as part of a circadian rhythm.[1]

A lighting system capable of reproducing natural light's variation throughout the day can ensure proper bodily function while still indoors, especially in indoor spaces without windows. However, variations to the lighting characteristics during the course of the day can be used to delay or expedite these signals. For example, extending the daylight lighting characteristics to be longer in a location with shorter daylight hours can trick the body into remaining alert longer than it normally would. Another example would include simulating sunset at a time specified by the user, rather than the natural sunset time, would signal the body's natural sleepiness response at a time that's more convenient.

In addition to the lighting system offering control over the natural circadian rhythm, other factors can also be incorporated into the lighting characteristics. These include occupancy status, pre-defined alarms or schedules, manual adjustment, and historical influence.

System

The System Consists of the Following Major Subsystems:
 Luminaires.
 Device Input
 Lighting Controller
 Historical Data
 Data Science Algorithms
 Configuration Rules FIG. 1 shows an exemplary autonomous circadian lighting system with environmental monitoring and sensor input while FIG. 10 shows an exemplary circadian lighting plan.

This solution monitors numerous environmental factors and sensor input to provide additional context for an appropriate Lighting setting at any particular moment. The system includes light sources 101 controlled by various inputs 102 such as data from the light sensor, motion sensor, contact sensor, switch, app, or voice command. The light sources 101 is also controlled by a lighting controller 105. Device input 102 is stored in history database 106 which is provided to a data science database 108 that also receives external data sources 107. The data science database is used to set configuration 109 which controls the lighting controller 105. Configuration 109 includes data on zones, circadian plan, schedule, user preference, motion timeout mode, energy saving mode, and home security mode. The lighting controller 105 also receives input from environment 110 such as time, time zone, location, weather, and season, for example.

Next, a Circadian Lighting Plan is detailed. A circadian lighting plan is a type of lighting system that is designed to mimic the natural pattern of daylight, which helps to regulate the body's internal clock or circadian rhythm. This type of lighting system is particularly important in environments where people spend a lot of time indoors and are not exposed to natural sunlight. The circadian lighting plan involves changing the color and intensity of the lighting throughout the day to mimic the natural pattern of daylight. The lighting system is typically set up to be brighter and bluer in the morning to help promote wakefulness and alertness. In the afternoon, the lighting becomes warmer and less intense to help promote relaxation and prepare the body for sleep. The circadian lighting plan can be adjusted based on the specific needs of the space and the people using it. For example, in a healthcare setting, the lighting system may be designed to promote healing and reduce stress in patients. In a workplace setting, the lighting system may be designed to improve productivity and reduce fatigue.

As illustrated in FIG. 20, the use of color and brightness in circadian lighting over a 24-hour period is a key component of supporting healthy sleep-wake cycles and overall well-being. During the day, the lighting system can provide bright and cooler color temperatures, which are similar to natural daylight. This can help to promote alertness and productivity, as well as regulate the body's natural production of melatonin, a hormone that regulates sleep.

As the day progresses into the evening, the lighting system can gradually transition to warmer color temperatures and lower brightness levels. This can help to promote relaxation and the body's natural production of melatonin, signaling the transition to bedtime. Throughout the night, the lighting system can maintain low levels of warm light to support restful sleep. In the morning, the lighting system can gradually increase the brightness and cooler color temperatures to simulate a sunrise and help the body wake up naturally.

By providing these color and brightness cues throughout the day and night, a circadian lighting system can help support healthy sleep-wake cycles and overall well-being, particularly for elderly individuals who may have disrupted sleep patterns or difficulty regulating their sleep-wake cycles.

Implementing a circadian lighting plan requires a combination of hardware and software components. Specialized LED lighting fixtures, sensors, and controls are used to create the desired lighting effects. Software programs can be used to monitor and adjust the lighting system based on the time of day and the needs of the users. The system would monitor various environmental factors, such as time, time zone, location, weather, and season, to determine the appropriate lighting setting at any particular moment. This information is received from environmental input 110 and used to inform the lighting controller 105. The system would also incorporate sensor input from various sources, such as light sensors, motion sensors, contact sensors, switches, apps, and voice commands. This data is collected from device input 102 and stored in the history database 106.

The data collected in the history database 106 is then used by the data science database 108 to set the configuration 109 for the lighting controller 105. This configuration includes data on zones, circadian plan, schedule, user preference, motion timeout mode, energy saving mode, and home security mode. The lighting controller 105 then uses this configuration to control the light sources 101, adjusting the lighting setting based on the data received from the various inputs and the configuration settings. For example, the circadian plan would adjust the lighting based on the time of day to promote healthy sleep patterns.

The system can also be customized for elderly care by incorporating additional sensors, such as those to monitor falls, and by adapting the lighting settings to promote healthy circadian rhythms in older adults. The system can also provide alerts or notifications to caregivers or family members based on the data collected, such as changes in lighting usage patterns or changes in environmental factors that may affect the elderly person's health. The system would work to create an optimal lighting environment based on the unique needs and preferences of the user, promoting healthy sleep patterns, and providing additional context for an appropriate lighting setting at any particular moment.

The circadian lighting plan can provide a range of benefits, including improved mood, increased productivity, and better sleep quality. It is an important consideration for any space where people spend a significant amount of time indoors. Numerous environmental factors and sensor input to provide additional context for an appropriate Lighting setting at any particular moment. Circadian lighting plans aim to provide lighting that is optimized for the user's health and wellbeing based on a variety of factors, including the time of day, natural light levels, and the user's activities and needs. Sensors can be used to monitor these factors and provide additional information that can help inform the lighting plan, such as the user's location within the home, their movement patterns, and the presence of natural light sources. By combining this data with an understanding of the user's circadian rhythm and the effects of light on the body, a circadian lighting plan can adjust the color and intensity of the lighting to promote better sleep, mood, and overall health.

Luminaires

The luminaires are devices capable of outputting light at various brightness levels and optionally change the light's correlated color temperature (CCT). Some common luminaire formats include, but are not limited to A19/21/25, BR20/30/40, MR11/16, PAR16/20/30/36/38, T5/8/10/14. Nightlights are also included, which are typically illuminated at night to provide low light for walking around in the dark.

Device Input

A user can adjust the lighting characteristics of brightness and color temperature through a variety of means that includes but is not limited to: a smart dimmer switch, a smart color temperature switch, a mobile application, a voice-enabled device. These devices allow for very specific adjustment to the lighting through manual input. An exact percent brightness or lighting level and even an exact color temperature.

Lighting Controller

The Lighting Controller is responsible for changing and maintaining the appropriate lighting brightness, color, and OnOff state for all luminaires in the system. It must update the lighting state given device input, and it must send out changes as required by configuration rules, weather changes, state of occupancy, and historical changes.

Historical Data

All user-adjusted changes will be recorded. The user's preferences as well as preferences of other users in the system will be used to adjust the lighting properties for a particular time of day.

Data Science Algorithms

Data science is used along with historical data to determine appropriate lighting properties for a specific time of day.

Configuration Rules

Pre-defined configuration rules, either configured by the user or by the system, may alter the natural circadian lighting schedule. These rules might include a schedule with specific start and end times, an alarm, an entirely different circadian plan that alters the timing of natural daylight brightness and color temperature, among others.

Processes

Occupancy

Motion On and Motion Timeout

When a room becomes occupied, the Lighting Controller will turn the lights on. When the room is no longer occupied, the Lighting Controller will turn the lights off.

Occupancy is determined algorithmically. The algorithm to determine the state of occupancy in a particular room will consider movement throughout the space, not just the room where motion is currently taking place. Even a lack of motion inside of the target room will not necessarily indicate unoccupancy. Motion will need to be seen outside of the target room before it should be considered for unoccupancy.

Reference Workflow diagram in FIG. 17. The room starts off as vacant (1701). When motion is detected (1702) this is considered a "Motion On" event and the Lighting Controller sends the command to turn the lights on with the appropriate color temperature and brightness (1703) for that time of day. The system waits for a time characteristic of individual motion patterns for that site (1704). Depending on whether motion is detected after the waiting period (1705), if it's detected (1705y) continue to wait (1704). If no motion is detected (1705n), check to see if motion has been detected in other rooms (1706). If motion has not been detected in other rooms (1706n), continue to wait (1704). If motion has been detected in other rooms (1706y), a "Motion Timeout" event has occurred (1707), and the Lighting controller sends the command to turn off the lights.

```
MotionDetected(zone)
    if zone.state == TIMED_OUT
        SendLightsOn(zone)
        zone.state =ON
        schedule(MotionTimeout(zone,
    zone.motionTimeout)
    MotionTimeout(zone)
        if zone.secsSinceLastMotion > zone.motionTimeout
        # zone lights should turn off over 5 seconds
        SendLightsOff(zone)
```

-continued

```
        zone.state = TIMED_OUT
        zone.recentManualAdjustment = false
        schedule(ReturnToPlan(zone), 120s)
    else
        diff = zone.motionTimeout -
zone.secondsSinceLastMotion( )
        schedule(MotionTimeout(zone), diff)
```

Site Exit

If an exterior door is closed (1802), data science determines the site is no longer occupied (FIG. 19). If the site is still occupied no change is needed (1804), if the site is no longer occupied (1805), all lights in the system are turned off (1806).

```
        SiteExitTask( )
            if ( MotionDetected( ) )
                exit
            else
                if ( ExitEventWithinWindow( ) )
                    schedule(SiteExitUpdateTask( ), 60s)
                else
                    exit
        SiteExitUpdateTask( )
            if MotionDetected( )
                exit
            else
                SiteTimeoutTask( )
        SiteTimeoutTask( )
            TurnOffLights(all_lights_group)
            for zone in siteZoneList
                zone.state == TIMED_OUT
```

Determining Occupancy

See FIG. 19. The site starts out as occupied (1901). The system waits for a time characteristic of individual motion patterns for that site (1902). A check for recent motion is performed (1903), if motion is detected (1903y) the site is determined to be occupied. If no motion is detected (1903n) the site is determined to be vacant.

Data Science to Update

Circadian Lighting Plan

Pre-Defined Circadian Plans

There will be a number of predefined circadian plans in the system.

Standard

The Standard circadian plan will mimic natural daylight color temperature and brightness as seen on a typical cloudless day in that location (latitude/longitude) (See FIG. 20). Weather data will be used to make minor adjustments to brightness to accommodate things like cloud cover, for example.

Energized

The Energized circadian plan will enter and remain in the bluest regions of the circadian plan No Color The No-Color circadian plan will change brightness throughout the day, but will not adjust color temperature.

No Brightness

The No-Brightness circadian plan will change color temperature throughout the day, but will not adjust brightness.

Jet-Lag Recovery

The Circadian Plan's schedule will gradually change over the course of the week to mimic one starting timezone and ending on the local timezone. This will help someone who has recently traveled gradually shift their sleep cycle to match the local time.

User Defined Circadian Plans

In addition to the pre-defined Circadian Plans, the user also has the ability to create/modify their own.

Off

The circadian plan will consist of a specific color temperature and brightness as defined by the user.

Custom

The circadian plan is customized by the user, with user-defined color temperatures and brightness levels for each 5 to 60 minute block of the day.

Manual Adjustments

Manual Brightness Change

The system will also consider manual adjustments to brightness made the user. This typically occurs with a smart dimming switch. If a manual adjustment to brightness has been made, color can continue to change throughout the day, but brightness will not be affected. The system will continue to avoid changing brightness until the room becomes vacant. Once the room becomes vacant, brightness will then continue to follow the circadian plan.

```
ProcessSwitchEvent(switch_event, zone)
    if switchEvent == move_up || switchEvent ==
move_down
        zone.state = ON
        zone.recentManualAdjustment = true
```

Manual Off

If the user chooses to turn off the lights, the lights should remain off while the user occupies the room. The system will continue to leave the lights off until the room becomes vacant. Once the room becomes vacant, the next occupancy will turn on the lights to the appropriate brightness according to the circadian plan.

```
ProcessSwitchEvent(switch_event, zone)
    if switchEvent == off
        zone.state = OFF
```

Circadian Plan Workflow Diagram

Reference FIG. 21. The circadian plan is applied when a change is needed as dictated by the plan (2101). The Lighting Controller will look up the Color Temperature and Brightness in the Plan Configuration appropriate for that time of day (2102). If the plan needs adjustment for Jet-Lag Recovery (see above), the color and brightness are adjusted accordingly (2103).

If the lights are not on, all changes are skipped (2104 & 2104n). If the plan indicates a change in brightness (2104y and 2105y) and there's been no manual change to brightness by the user (2106n), the lighting brightness is gradually adjusted over 5 minutes (2106). If there is no change to plan brightness or if the user has made a manual change to brightness recently, brightness adjustment is skipped (2105n & 2106y).

If the plan indicates a change in color temperature (2108y), color temperature is gradually adjusted over 5 minutes (2109). If the plan indicates no change in color temperature (2108n), color temperature adjustment is skipped.

```
ApplyCircadianPlan(zone)
    # Runs every hour
    brightness = GetPlanBrightness(now( ))
```

-continued

```
        color = GetPlanColor(now( ) )
        ApplyPlanColor(color, zone)
        ApplyPlanBrightness(brightness, zone)
        # Color and brightness sent will slowly adjust
   over 5 minutes
     ApplyPlanColor(color, zone)
        if zone != null
           SendColor(zone.group, color)
        else
           SendColor(all_lights_group, color)
     ApplyPlanBrightness(brightness, zone)
        # Reduce necessary commands by checking if
        if zone != null and !zone.recent_manual_adjustment
           SendBrightness(zone.group, brightness)
           return
        if not BrightnessAdjustmentAnyZone( )
           SendBrightness(all_lights_group, brightness)
        else
           for zone in siteZoneList
              if !zone.recent_manual_adjustment:
                 SendBrightness(zone.group, brightness)
```

Sleep and Wake Modes

The system will use modes of Sleep and Wake to alter behavior specific to waking hours and sleeping hours.

Sleep Mode

When entering sleep mode, lights are turned off in the entire home and their settings are adjusted to simulate a nightlight with low brightness and warm color temperature. Warmer color temperatures have been shown reduce the "wakefulness" characteristic of cool/blue light.

Reference workflow diagram in FIG. 22. When the sleep button is pushed (2101) on a switch designated as a Sleep switch, all lights in the house are turned off (2102). The brightness and color temperature are set on all lights to be appropriate for nighttime (low brightness and warm color temperature) (2103). All, night lights are turned on (2104) to assist in seeing if walking around at night. Any zones designated as a Sleeping area are set to not turn on with motion (2105y & 2106). Non-sleeping areas can turn on with Motion (2107).

Sleep Mode is triggered by a switch where type is "sleep".

```
        Sleep/Wake(switch_event)
           if switch_event == off or switch_event ==
   move_down
              SleepLogic( )
           if switch_event == on or switch_event == move_up
              WakeLogic( )
        SleepLogic( )
           TurnOffLights(all_lights_group)
           TurnOnLights(all_nightlights_group)
           for zone in siteZoneList
              zone.lighting_mode = sleep
              if zone.type == bedroom
                 zone.state = OFF
              else
                 zone.state = TIMED_OUT
        WakeLogic( )
           TurnOnLights(all_lights_group)
           TurnOffLights(all_nightlights_group)
           for zone in siteZoneList
              # turn on room switch is assigned to
              if zone == switch.zone
                 zone.state = ON
              # Note: bedrooms not assigned to current
   switch stay "off"
```

```
              else if zone.state == OFF
                 zone.state == TIMED_OUT
              #Note: zones currently in "on" or
   "TIMED_OUT" state do
                 not change states
           ApplyCircadianPlan( )
```

Wake Mode

While in wake mode, lights follow the circadian plan as selected by the user with color and brightness changing as necessary throughout the day.

Reference Wake Workflow in FIG. 23. When the wake button is pushed (2301), the lights in the room where the wake button was pushed are turned on to the brightness and color temperature appropriate for that time of day according to the circadian plan (2302). All nightlights in the system are turned off (2303). The current room and all non-Bedroom rooms are allowed to turn on with motion (2304). Any other bedrooms remain unchanged.

Auto-Wake

If the user forgets to enter wake mode when getting up in the morning, as soon as motion is seen outside of the bedroom, all non-bedroom rooms will automatically enter wake mode.

Reference Auto-Wake Workflow in FIG. 24. When a the system is in sleep mode (2401) and a non-sleeping area becomes occupied (2402), the system will automatically enter wake mode. The lights in the occupied room will turn on to the appropriate brightness and color temperature appropriate for that time of day according to the circadian plan (2403). All nightlights in the system are turned off (2404). All non-bedrooms are allowed to turn on with motion (2405). Bedrooms remain unchanged.

AutoWake is triggered by motion and only if it's enabled and the site is in Sleep

```
        AutoWake( )
           if wakeUpEnabled and AfterAutoWakeUpTime( ):
              StartAutoWake( )
        StartAutoWake( )
           for zone in siteZoneList
              if zone.type == bedroom
                 continue
              else
                 zone.lighting_mode = wake
                 if zone.state == OFF
                    zone.state = TIMED_OUT
           TurnOffLights(all_nightlights_group)
           ApplyCircadianPlan( )
```

Response Auto-Wake

In systems located in a space where caregivers address potential resident issues, the need for bright light is needed. If the system is in sleep mode, using nighttime brightness and color temperature levels, the lighting can be inadequate. The system will automatically wake itself when the system detects the caregiver has entered the space.

Reference the Response Auto-Wake Workflow in FIG. 25. When the system is in sleep mode (2501), if a normal switch On button is pushed (2503) within 5 minutes of an exterior door being opened (2502), the system will turn on lights in the current room to the brightness and color temperature appropriate for that time of day (2504). All nightlights in the system are turned off (2505). All rooms are allowed to turn on with motion (2506).

AutoResponseWake is triggered with a switch on/move up event when the system is in Sleep

```
ProcessSwitchEvent(switch_event)
    if AllZoneInSleep( ) or not isAutoResponseEnabled
        return
    if switch_event == on or switch_event == move_up
        AutoResponseWake( )
AutoResponseWake( )
    for zone in siteZoneList
        if zone == switch.zone
            zone.state = ON
        if zone.state == OFF
            zone.state = TIMED_OUT
        zone.lighting_mode = wake
    ApplyCircadianPlan( )
    TurnOffLights(all_nightlights_group)
```

Power Cycling Lights

Lights that have been powered off for some time and are powered on will need their color and brightness adjusted to match the circadian plan.

Reference the Bulb Power On Workflow in FIG. 26. When the system detects a bulb has been powered on (2601), the system checks if the rooms in the system are in Wake Mode (2602). If the room is in Wake mode, the appropriate color and brightness are applied per Workflow defined at 2101. If the room is in Sleep mode, Nighttime brightness and color are applied over 10 seconds (2603).

When a device is power cycled, it is detected and settings are resent

```
PowerCycleDetected(device)
    if not SystemInAssignmentMode( )
        schedule(ResendZoneSettingsTask( ), 10s)
ResendZoneSettingsTask( )
    SendSettingsToDevices( )
    If no new devices have joined:
        exit
    else
        schedule(ResendZoneSettingsTask( ), 10s)
SendSettingsToDevices( )
    for device in all_joined_devices:
        zone_list += device.zone
    for zone in zone_list:
        if zone.lighting_mode == wake
            ApplyCircadianPlan(zone)
        else # lighting_mode == sleep
            SendColor(zone.nightlight_color, zone)
            SendBrightness(zone.nightlight_brightness, zone)
```

Return to Plan

When the user manually adjusts the brightness in a room, or manually turns the lights off, the user has chosen to deviate from the circadian plan. A return to plan will be necessary to get the user/room back to the appropriate brightness for that time of day. This occurs when the room becomes vacant for a short period of time.

Reference the Return To Plan Workflow in FIG. 27. The system has detected a manual brightness change to a room or the lights manually turned OFF (2701). The system will wait for the room to become vacant (2702) as described in the occupancy workflow in FIG. 19. Once the room is vacant, the system can apply the appropriate brightness and color temperature appropriate for that time of day per the circadian plan (2703).

```
# Two conditions can trigger ReturnToPlan( ):
#   When the zone times out (see MotionTimeout(zone) )
#   When the resident leaves the site
# Will only trigger if ReturnToPlan is enabled
SiteVacated( )
    for zone in siteZoneList
        schedule(ReturnToPlan(zone), 120s)
ReturnToPlan(zone)
    # If the zone hasn't had a manual adjustment
recently,
    # it already has the correct settings
    if (zone.recentManualAdjustment == false)
        return
    # If motion has been seen since we scheduled, do
nothing
    if (zone.secsSinceLastMotion > 120s)
        return
    ApplyCircadianPlan(zone)
```

Many other variations within the scope of the invention are possible. Many choices will be available to those skilled in the art who are made aware of the nature of this invention.

While the principles of the invention have been shown and described in connection with specific embodiments, it is to be understood that such embodiments are by way of example and are not limiting.

The invention claimed is:

1. An autonomous circadian lighting system, comprising:
one or more light sources controlled by data from a plurality of battery powered sensors including a motion sensor placed on selected part of a residence including a bedroom and a bathroom, contact sensor, switch, app, or voice command;
a lighting controller that controls the light sources based on configuration data;
a history database that stores device input, wherein at least one sensor is assigned to a sleep zone with a user indicating a sleep period to disable the one or more light sources from activation by a motion or another trigger, and the user further indicating a wake period to restore the one or more lights to activate according to a circadian rhythm and motion, and in an absence of user indication and based on sleep habit in the history database, the lighting controller automatically enables the wake period and turns on the one or more lights based on motion;
a data science database that sets the configuration data based on the device input and external data sources; and
an environment input that includes time, time zone, location, weather, and season.

2. The system of claim 1, wherein the light sources are configured to adjust color temperature and intensity to mimic natural daylight throughout the day.

3. The system of claim 1, wherein a motion sensor input is used to detect occupancy and trigger lighting changes.

4. The system of claim 1, wherein a contact sensor input is used to detect open doors or windows and adjust lighting accordingly.

5. The system of claim 1, wherein the configuration data includes a circadian plan that adjusts lighting settings based on time of day.

6. The system of claim 1, wherein the configuration data includes a home security mode that triggers lighting changes to simulate occupancy when the resident is away.

7. The system of claim 1, further comprising sensors for detecting resident activity levels and adjusting lighting accordingly to promote an active lifestyle.

8. The system of claim 1, further comprising sensors for detecting ambient temperature and humidity, and adjusting lighting accordingly to maintain a comfortable environment for the resident.

9. The system of claim 1, further comprising sensors for detecting noise levels, and adjusting lighting accordingly to promote a rest environment for the resident.

10. The system of claim 1, further comprising a sleep tracker that monitors the resident's sleep patterns and adjusts the lighting accordingly to promote healthy sleep habits.

11. The system of claim 1, further comprising a voice-activated control system that allows the resident to adjust the lighting settings as desired.

12. The system of claim 1, further comprising a security system that uses the lighting to simulate occupancy when the resident is away from home, providing a sense of security and deterring potential intruders.

13. The system of claim 1, further comprising a feature that provides reminders for medication or other tasks based on the resident's circadian rhythm.

14. The system of claim 1, further comprising a feature that adapts the lighting plan based on the resident's activity levels and preferences, promoting engagement and independence.

15. The system of claim 1, further comprising a mobile app that allows caregivers or family members to remotely monitor the resident's lighting and activity patterns, providing peace of mind and enabling proactive interventions if needed.

16. The system of claim 1, comprising one or more directed acyclic graphs (DAGs) to the streaming data from at least the sensor and the one or more activities of a person to identify a pattern from streaming data for alert or notification of one or more predefined conditions affecting wellness, wherein the DAG identifies one or more inhibitions based on time intervals so that notifications are only triggered when certain conditions persist for a certain period.

17. The system of claim 1, comprising code to detect motion activity and bathroom visits by analyzing motion data, processing zone occupancy, and calculating bathroom visits.

* * * * *